Examiner

BEST AVAILABLE COPY

April 7, 1936. E. J. GENGLER Re. 19,922

STOCK ENCLOSURE AND SYSTEM OF ELECTRICALLY CHARGING THE SAME Orig. 1,976,721

Original Filed Nov. 23, 1932 flashing of this lamp indicates that current is being supplied to fence wire flashing of this lamp indicates that an animal is in contact with fence & that latter is grounded Inventor E. J. Gengler By [illegible]

Attorneys

10

Exam

Reissued Apr. 7, 1936

Re. 19,922

UNITED STATES PATENT OFFICE 19,922

STOCK ENCLOSURE AND SYSTEM OF ELECTRICALLY CHARGING THE SAME

Edwin J. Gengler, Milwaukee, Wis.

Original No. 1,976,721, dated October 16, 1934, Serial No. 644,125, November 23, 1932. Application for reissue August 31, 1935, Serial No. 38,810

4 Claims. (Cl. 177—311)

This invention relates to an improved protective stock enclosure and system of electrically charging the same.

The invention seeks, among other objects, to provide an enclosure wherein one or more of the fence wires thereof will be electrically charged so that an animal coming in contact with the fence will receive an electric shock and will thus be deterred from breaking through the fence to escape.

The invention seeks, as a further object, to provide an enclosure wherein the fence wires thereof will be electrically charged periodically so that should an animal come in contact with the fence at the time it is charged and is shocked to such a degree as to prevent a voluntary release from the fence, subsequent de-energization of the fence wires will permit the animal to move away from the fence without effort so that injury which might otherwise ensue to the animal will be avoided.

Another primary object of the invention is to provide an enclosure wherein the time interval of energization of the fence may be readily regulated to suit varying conditions and the sizes of the animals being restrained.

A further salient object of the invention is the provision of means incorporated with the fence, whereby to prevent an excessive flow of current through the shock circuit, so that injury to the animals will be eliminated.

A still further object of the invention is to provide a lamp or equivalent means in the shock circuit for serving the dual function of giving the signal when the shock circuit is closed, and for predetermining the current and voltage in the circuit to prevent injury to the animals.

In this connection it is a particular object of this invention to provide a signal so connected with the shock circuit as to indicate by its signal strength or intensity, the nature of the ground connection closing the shock circuit and thereby depict the state of operativeness of the shock circuit.

A still further object of my invention is to provide means which will permit the using of a commercial supply circuit, such as is found on farms, ranches, etc., for electrically charging a fence without danger to man or animals.

Other and incidental objects, not particularly mentioned in the foregoing, will be apparent during the course of the following description.

In the accompanying drawing forming part of this specification:

Figure 1:
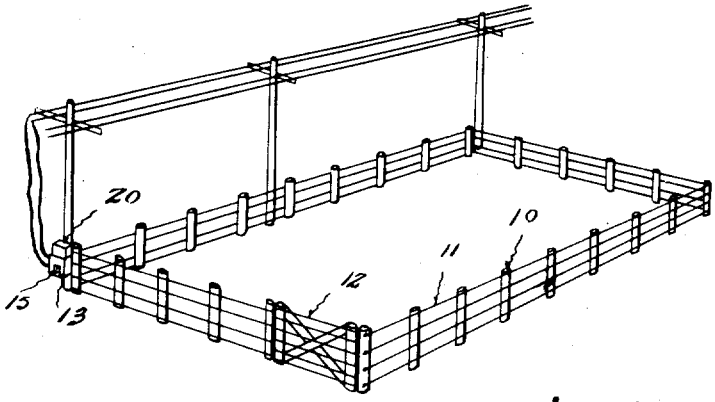
Figure 1 is a perspective view of a stock enclosure embodying my invention.
Figure 3:
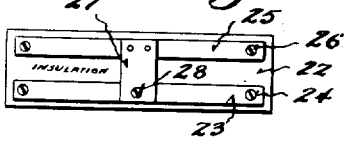
Figure 3 is a plan view of the circuit closer.
Figure 2:
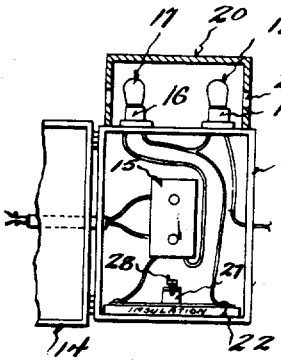
Figure 2 is a front elevation showing the box preferably employed to house the switch and circuit closer used.

Referring now more particularly to the drawing, I have shown a stock enclosure which is intended to typify any suitable enclosure for live stock or other animals. In the present instance, I have shown fence posts 10 which carry a number of fence wires, one of which is indicated at 11. Any approved number of fence wires may, of course, be used or, in lieu thereof, a woven wire fence may be substituted. A gate for the enclosure is shown at 12.

In order to house certain operating parts of my device, I preferably provide a suitable metal or like box 13 having an entrance door 14. This box may be mounted adjacent to the enclosure, as shown in Figure 1, or at any other convenient or approved location. Arranged within the box is any preferred type of manually operated switch 15. The specific construction of the switch 15 is unimportant, and obviously any desired type of switch can be utilized. Mounted within the box or upon the top wall of the box is a lamp socket 16, which removably receives a flasher lamp 17. Arranged adjacent to the socket 16 is a like socket 18, which removably receives a combined load and flasher lamp 19. If desired, a protecting hood 20 may be provided for the lamps 17 and 19. As shown, the hood simply rests on the top wall of the box 13 so that the hood may be readily removed when necessary, and formed in the hood are sight openings 21 so that the flashing of the lamps 17 and 19 may be readily observed.

Mounted upon the bottom wall of the box is a circuit closer. In this instance, I have shown the use of a thermostatic circuit closer, but it is to be understood that any approved circuit closer of other type may be substituted therefor. The circuit closer shown includes, as will be observed, an oblong base 22, which is of suitable insulating material, and extending longitudinally of the base is an appropriate high resistance metallic thermostatic strip 23 anchored at its ends by fastening devices 24.

Figure 4:
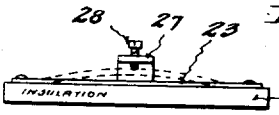
Figure 4 is an edge elevation of the circuit closer.

Extending parallel to the strip 23 is a nonthermostatic conductor strip 25 secured at its ends to the base by fastening devices 26. Fixed to the strip 25, medially thereof, is a plate 27 offset to overhang the strip 23, and screwed through said plate, near its free end, is a contact screw 28. When current is passed through the strip 23, and, due to its resistance, said strip is caused to heat, the strip will, as shown in dotted lines in Figure 4, expand and bow upwardly to engage the screw 28 for closing a circuit therethrough.

Figure 6:
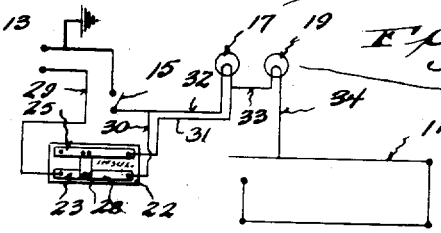
Figure 6 is a diagrammatic view showing the circuits.
Figure 5:
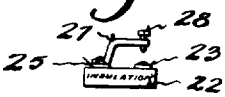
Figure 5 is an elevation of the circuit closer particularly showing the contact screw employed.

Leading from one side of a suitable supply circuit, such as is commercially used and found on farms, ranches, etc., as particularly shown in Figure 6, is a wire 29 connected to one end of the strip 23 of the circuit closer, and leading from the opposite end of said strip to return to the other side of the supply circuit is a wire 30 interrupted by the switch 15. Thus, the wires 29 and 30 provide a primary circuit for heating the thermostatic element 23, flow of current in said circuit being controlled by the switch 15, which is used as a manual means for opening and closing the circuit.

Connected to one end of the conductor strip 25 of the circuit closer is a wire 31 leading to one side of the lamp 17, and leading from the other side of said lamp is a wire 32 connected with the wire 30 of the primary circuit. The wires 31 and 32 thus provide a flasher circuit paralleling the lamp 17 with the heating or primary circuit, thus giving visual evidence that the heating circuit is being made and broken at a predetermined frequency. Connected with the wire 31 of the flasher circuit is a wire 33 leading to one side of the lamp 19, and leading from the opposite side of said lamp to the fence wire 11 is a wire 34. The wires 33, 34 and 11 thus provide an open shock circuit connecting the lamp 19 in series with one side of the flasher circuit. By choosing a lamp, resistance, reactance, or other device of this nature of the proper electrical dimensions, the current and voltage of said circuit may be easily predetermined. Thus, a lamp is selected for limiting the flow of current in the shock circuit to an amount which is not dangerous to man or animals.

While I have shown a lamp 19 in the shock circuit, it is to be understood that other devices can be utilized in lieu thereof for regulating the strength of the current and voltage in the shock circuit.

However, it is essential that the means employed also provide a signal, or that some other signal means be provided so that the state of operativeness of the shock circuit will be at all times indicated.

Assuming now that the switch 15 is closed, it will be seen that current will flow through the wires 29 and 30 for heating the element 23, as previously described, when this element will flex upwardly to engage the screw 28. Current will then flow through the screw, the plate 27, strip 25, and wires 31 and 32 for energizing the lamp 17, with the result that the lamp will be caused to flash for giving a visible signal of the operation of the circuit closer.

In this connection, it should be noted that the resistance of the flasher circuit, including the lamp 17, is less than the resistance offered by half the length of the strip 23 so that upon engagement of said strip with the contact screw 28, current will, as stated, flow in the flasher circuit. Upon the engagement of the strip with the contact screw 28, however, the reduction in the flow of current therethrough, for the reason just stated, will result in immediate cooling of the strip and its consequent contraction out of engagement with the screw 28. Accordingly, the flasher circuit will be broken to extinguish the lamp 17 with resultant re-heating of the strip 23 to again engage the contact screw, and this cycle will be repeated indefinitely as long as the switch 15 remains closed.

When the flasher circuit is closed, the open shock circuit formed by the wires 33, 34, and 11, and including the lamp 19, will be energized so that should an animal within the enclosure at that time come in contact with the wire 11, the circuit will be closed through the animal to the ground with resultant electrical shock to the animal.

When the contact strip 23 subsequently moves away from the contact screw 28, however, the shock circuit will, as will be perceived, be de-energized so that the animal will be permitted to freely move away from the enclosure fence. Injury which might otherwise result to the animal will thus be avoided.

Furthermore, as will be seen, by adjusting the screw 28 of the circuit closer downwardly to decrease the movement of the strip when heated, the length of time the shock circuit is de-energized may be prolonged. Also, it is to be noted that when the shock circuit is closed by an animal coming in contact with the wire 11, the lamp 19 will be energized to thus visually indicate that the animal is, at some point in the enclosure, in contact with the fence. Accordingly, should the lamp 19 continue to flash each time the lamp 17 flashes, such condition will indicate to the owner or the caretaker that the animal is entangled in the fence so that immediate aid may be given.

The continued flashing of the lamp 19 would also indicate that the fence has been grounded in some other manner as by part of the charged wire sagging to the ground or some extraneous element bridging it electrically to the ground. If the flashes of the lamp, or in other words its signal, are of maximum intensity it is an indication that the shock circuit is wholly grounded and dead, but if the light is dim it indicates that the fence is at least partially charged.

From the foregoing, it can be seen that I have provided a device whereby the conventional electric power system may be used as a source of electrical supply for energizing an animal shock circuit without danger to man or animals, and thereby eliminate the necessity of providing local battery circuits, etc., as previously contemplated in this art.

Having thus described the invention, I claim:

1. In combination with a fence having a bare wire adapted to be electrically grounded through the body of an animal coming in contact therewith, means for intermittently and momentarily electrically energizing said bare wire comprising an electrical circuit adapted to be connected with a source of electrical energy so as to be energized thereby, an automatic circuit making and breaking device permanently connected in said circuit to be operable by the electrical energy thereof as long as said circuit is closed, said circuit making and breaking device including a contact which is connected with said energized circuit, means for connecting the bare wire with said contact so that said wire is electrically connected with the energized circuit whenever the circuit making and breaking device is in circuit closing condition, the "open" period of the circuit making and breaking device being of sufficient duration to release an

10 animal coming in contact with the bare wire, and a signal controlled by said circuit making and breaking device to indicate the operativeness of the system.

2. In combination with a shock circuit comprising a bare wire strung as a fence and adapted to be electrically grounded through the body of an animal coming in contact therewith, means for intermittently and momentarily electrically energizing said bare wire, and a signal device connected in series with said bare wire to be operable by the grounding of said wire through the body of an animal contacting the same or in any other manner, said signal device operating with an intensity depending upon the electrical resistance of the ground connection so that the nature of the ground connection and the state of operativeness of the shock circuit is indicated by the intensity of the signal.

3. In combination with a shock circuit comprising a bare wire strung as a fence and adapted to be electrically grounded through the body of an animal coming in contact therewith, means for intermittently and momentarily electrically energizing said wire, a signal device operable continuously and concomitantly with the intermittent energization of said bare wire, and a second signal device connected in series with the bare wire to be operable upon the grounding of said wire in any manner, said signal device operating with an intensity depending upon the electrical resistance of the ground connection so that the character of the ground connection and the state of operativeness of the shock circuit is indicated by said signal device.

4. In combination with a fence having a bare wire adapted to be electrically grounded through the body of an animal coming in contact therewith, means for intermittently and momentarily electrically energizing said bare wire comprising an electrical circuit adapted to be connected with a source of electrical energy so as to be energized thereby, an automatic circuit making and breaking device permanently connected with said circuit to be operable by the energy thereof as long as said circuit is closed, a signal device operable concomitantly with the action of the circuit making and breaking device and continuing in operation as long as said circuit making and breaking device is operative means for connecting the bare wire with said energized circuit through the circuit making and breaking device so that the bare wire is intermittently and momentarily energized at the dictation of said circuit making and breaking device, and a second signal device connected in series with the bare wire to be operable upon grounding of the wire in any manner, the intensity of said second signal device being dependent upon the electrical resistance of the ground connection so that the character of the ground connection and the state of operativeness of the system is indicated by said second signal device.

EDWIN J. GENGLER.